UNITED STATES PATENT OFFICE.

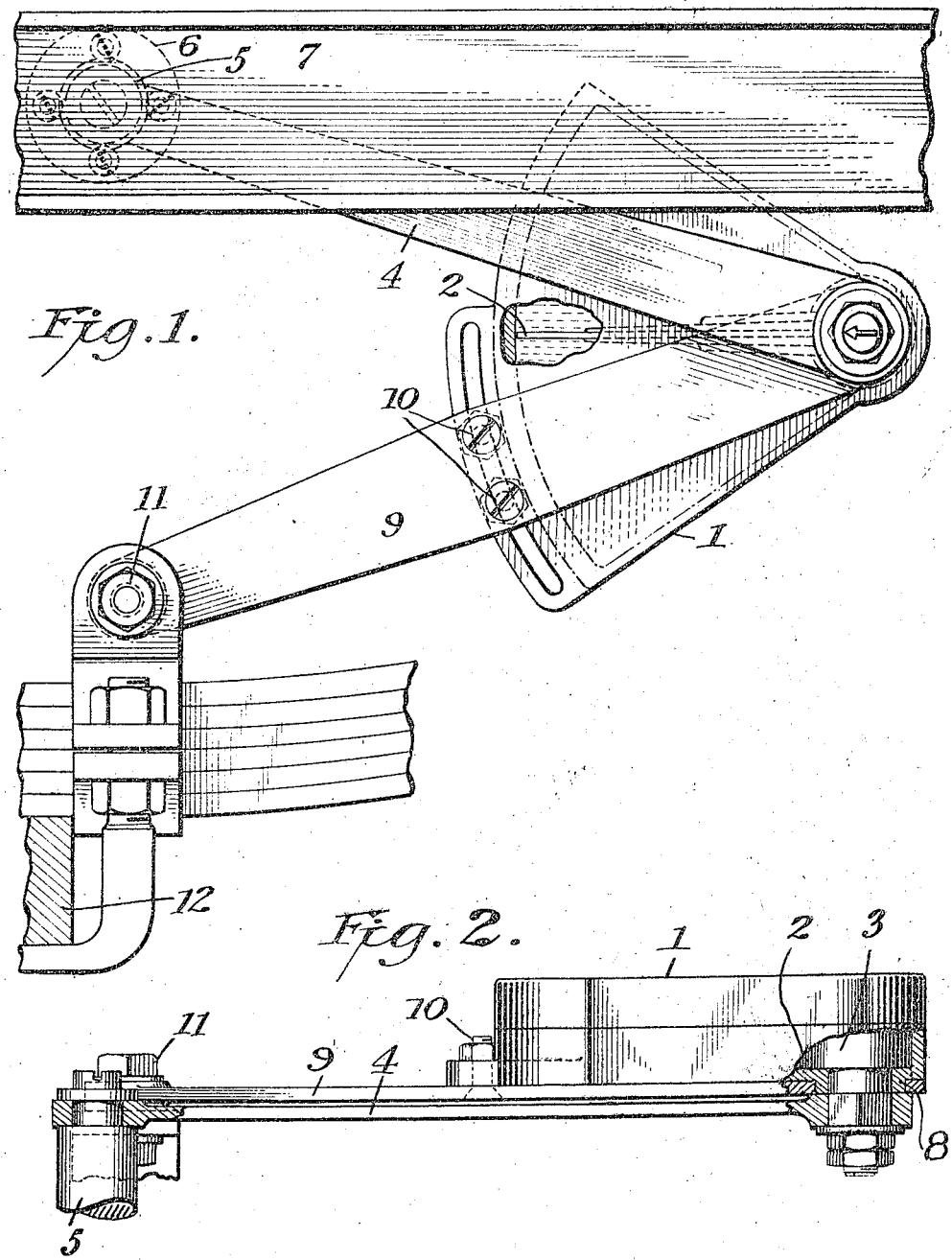

RUSSELL S. CARTER, OF HEWLETT, NEW YORK.

SHOCK-ABSORBER CONNECTION.

1,203,580.

Specification of Letters Patent.

Patented Nov. 7, 1916.

Application filed February 24, 1914. Serial No. 820,482.

*To all whom it may concern:*

Be it known that I, RUSSELL S. CARTER, a citizen of the United States, residing in Hewlett, Nassau county, New York State, have invented the following-described Improvements in Shock-Absorber Connections.

The improvement relates to shock-absorbers of the kind wherein a rotary member confined in a casing modifies or assists the action of the springs of a vehicle in taking up shocks, and provides a simple and convenient form of adjustable connection for such devices whereby they may be readily applied to various kinds of vehicles and adjusted thereon to accommodate the normal compression of the springs thereof, as hereinafter explained and more particularly pointed out in the claims.

In the accompanying drawing illustrating the invention: Figure 1 is a side view of a shock-absorber of the elbow type applied between the frame of an automobile and its axle by means of this invention. Fig. 2 is a plan view of the same, partly in section.

While the invention is not confined to any particular type of shock absorber, I have illustrated the same herein as used with a dash pot shock absorber in which the piston member is a stiff spring blade adapted to re-act on the springs of the vehicle through its connections, and retarded by the inertia and friction of a body of liquid confined in a casing. Such shock absorber forms the subject of a pending application, Serial No. 771,614, filed by me on June 4th, 1913, to which reference may be had for the details of construction thereof. The casing 1 of such absorber is of general sector shape provided with parallel side walls which are vertical when the absorber is connected to the vehicle. The spring blade 2 is set in a hub 3 which is journaled in the casing with one end projecting to the exterior thereof and also squared to receive an arm 4 held thereon by means of a screw, nut or otherwise. The free end of the arm 4 is pivoted to a stud 5 projecting from a plate 6, which can be attached to one of the two members between which shock is to be absorbed, for instance to the side girder 7 of an automobile. In order to secure the casing 1 to the other of the parts between which shock is to be absorbed, for example to the axle 12 of the automobile, I provide a boss 8 on the casing which is preferably concentric with the hub 3 forming a part of the bearing which the same has upon the casing. On this boss I swivel a second arm 9, about equal in length to the arm 4 and capable of being clamped against the casing in different angular relations thereto. For this purpose the casing is provided with an arcuate bolt slot formed in a flange near its curved end wall, and one or more bolts 10 are passed through this slot and through the arm 9 as shown in the drawing. The free end of the arm 9 is adapted for pivotal connection with the axle 12 by means of a stud 11, or otherwise. When the outer ends of both divergent arms have been thus pivotally fastened to the parts of the vehicle the casing 1 may then be turned on its hub, and in the arm 9, until the spring blade or piston member 2 thereof is brought to a normal or centralized position therein such as it should occupy when the vehicle frame and axle are separated by a normal distance, that is to say when the vehicle is supporting its normal load. It is essential that the casing be set so that the spring blade shall not strike it at either end of its oscillation and for this purpose it must occupy a substantially mid position under normal running conditions. The bolts 10 are tightened when the casing has been thus adjusted and the device is ready for service. A mark formed on the end of the hub or elsewhere serves to indicate the angular relation of the blade (which is within the casing) with relation to the arm 4 and as an assistance in making the described adjustment.

It is preferred that both arms, 4 and 9, be disposed upon the same side of the casing 1, and also that the arm 9 shall be concentric with the hub and sector-shaped casing, but the invention is not confined to any specific location of the said parts, provided they function in the manner indicated and except as specifically pointed out in the appended claims.

I claim:

1. An elbow type shock-absorber for vehicles, comprising in combination a closed liquid-containing casing, an oscillatory piston member therein, having a hub, two divergent lever arms concentrically disposed with reference to the hub and provided with means at their free ends for pivotally connecting them respectively to the parts between which shock is to be absorbed, one of said arms being fixed to the hub and the other being movably engaged to the vertical side wall of the casing and provided with clamping means whereby said closed casing may be secured thereto in different angular positions.

2. A vehicle shock-absorber, comprising a closed liquid-containing casing having parallel vertical side walls, an oscillatory piston therein having a hub, a lever arm on such hub adapted at its outer end for connection with one of the parts between which shock is to be absorbed, and a member adjustably secured to one of the said vertical side walls and adapted for connection to the other of the parts between which shock is to be absorbed.

3. A vehicle shock-absorber comprising a closed substantially sector-shaped liquid-confining casing having parallel vertical side walls, an oscillating piston between such walls and a hub for the piston projecting to the exterior thereof, in combination with a pair of members respectively connecting said hub and casing to the parts between which the shock is to be absorbed, both of said means being on the same side of the closed casing and one of them being adjustably fixed to the proximate vertical side wall thereof, whereby the casing can be centered with reference to the piston therein.

4. A vehicle shock-absorber comprising a closed liquid-containing casing having an oscillatory piston therein and a hub for said piston extending to the exterior of the casing, a lever arm on said hub, a boss on the casing, a second arm member hinged to such boss and means for fixing the latter member in different angular positions with reference to said boss.

5. A vehicle shock-absorber comprising a closed liquid-containing casing, an oscillating piston therein connected to one of the parts between which shock is to be absorbed, and means for securing the casing to the other of the parts between which shock is to be absorbed, comprising a member pivotally mounted at one point on the casing and having a bolt-and-slot connection at a remote point with said casing.

6. A vehicle shock-absorber comprising a closed liquid-containing casing, an oscillating piston therein having a hub, and a lever arm fixed to such hub in combination with a boss on the casing surrounding the hub, a member pivotally mounted upon the said boss, and means remote from the boss for securing said member in different angular positions to the casing.

In testimony whereof, I have signed this specification in the presence of two witnesses.

RUSSELL S. CARTER.

Witnesses:
L. D. ALLIM,
G. W. MORRISON.